(12) United States Patent
Passe et al.

(10) Patent No.: US 11,702,196 B2
(45) Date of Patent: Jul. 18, 2023

(54) ROTOR SYSTEM WITH RECONFIGURABLE DUCT

(71) Applicant: Bell Textron Inc., Fort Worth, TX (US)

(72) Inventors: Brad Joseph Passe, Irving, TX (US); Nicholas Ralph Carlson, Dallas, TX (US); George Matthew Thompson, Lewisville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 403 days.

(21) Appl. No.: 16/912,513

(22) Filed: Jun. 25, 2020

(65) Prior Publication Data
US 2021/0403149 A1     Dec. 30, 2021

(51) Int. Cl.
| | |
|---|---|
| *B64C 27/08* | (2023.01) |
| *B64C 27/37* | (2006.01) |
| *B64C 27/473* | (2006.01) |
| *B64C 39/02* | (2023.01) |
| *B64C 29/00* | (2006.01) |
| *B64U 30/20* | (2023.01) |
| *B64U 50/14* | (2023.01) |
| *B64C 27/54* | (2006.01) |

(52) U.S. Cl.
CPC .............. *B64C 27/08* (2013.01); *B64C 27/37* (2013.01); *B64C 27/473* (2013.01); *B64C 27/54* (2013.01); *B64C 29/0016* (2013.01); *B64C 39/024* (2013.01); *B64U 30/20* (2023.01); *B64U 50/14* (2023.01)

(58) Field of Classification Search
CPC ....... B64C 11/001; B64C 27/08; B64C 27/20; B64C 27/37; B64C 27/52; B64C 29/0016; B64C 29/0033; B64C 2201/162; B64D 29/08
See application file for complete search history.

(56) References Cited

U.S. PATENT DOCUMENTS

| | | | | |
|---|---|---|---|---|
| 6,220,546 | B1 * | 4/2001 | Klamka ................. | B64D 29/00 244/129.4 |
| 7,789,347 | B2 * | 9/2010 | Oberle .................... | B64D 29/08 244/129.4 |
| 11,124,286 | B1 * | 9/2021 | Piedmonte ............ | B64C 39/024 |
| 2018/0086447 | A1 * | 3/2018 | Winston ................ | B64C 39/066 |
| 2018/0093777 | A1 * | 4/2018 | Cheung .................. | B64D 29/04 |
| 2022/0111972 | A1 * | 4/2022 | Besse ..................... | B64D 29/06 |

* cited by examiner

*Primary Examiner* — Philip J Bonzell
*Assistant Examiner* — Colin Zohoori
(74) *Attorney, Agent, or Firm* — Akona IP

(57) ABSTRACT

A rotor system includes a rotor assembly and a duct system. The rotor assembly includes rotor blades extending from a mast axis and configured to rotate about the mast axis. The duct assembly includes a moveable duct portion and a stationary duct portion. In a first duct configuration, the moveable duct portion surrounds a first portion of the rotor assembly, the stationary duct portion surrounds a second portion of the rotor assembly, and the moveable duct portion and the stationary duct portion enclose the rotor assembly. In a second duct configuration, the stationary duct portion surrounds the second portion of the rotor assembly, and the moveable duct portion is moved away from the first portion of the rotor assembly, such that the rotor assembly is not enclosed.

20 Claims, 6 Drawing Sheets

ROTOR SYSTEM WITH RECONFIGURABLE DUCT

TECHNICAL FIELD

This disclosure relates in general to the field of aircraft and, more particularly, though not exclusively, to a rotor system with a reconfigurable duct for use in aircraft.

BACKGROUND

Rotor systems provide thrust and/or propulsion in aircraft. For example, tiltrotor aircraft use tilting rotors (or "tiltrotors") that provide vertical thrust during takeoff and hover mode and forward propulsion during cruise mode. During hover, the planes of rotation of the tiltrotors are aligned parallel to the ground to generate lift. During cruise, the tiltrotors are tilted forward, with the plane of rotation perpendicular to the ground, or angled relative to the ground. Ducted rotors provide superior thrust output during the hover mode compared to non-ducted rotors of the same diameter. However, during the cruise mode, rotor ducts create drag at a higher level than the thrust they produce.

SUMMARY

One embodiment is a rotor system that includes a rotor assembly and a duct system. The rotor assembly includes rotor blades extending from a mast axis and configured to rotate about the mast axis. The duct assembly includes a moveable duct portion and a stationary duct portion. In a first duct configuration, the moveable duct portion surrounds a first portion of the rotor assembly, the stationary duct portion surrounds a second portion of the rotor assembly, and the moveable duct portion and the stationary duct portion enclose the rotor assembly. In a second duct configuration, the stationary duct portion surrounds the second portion of the rotor assembly, and the moveable duct portion is moved away from the first portion of the rotor assembly, such that the rotor assembly is not enclosed.

In a first example, in the second duct configuration, the moveable duct portion is positioned around the stationary duct portion, such that the stationary duct portion and the moveable duct portion surround the second portion of the rotor assembly. The moveable duct portion may have a first radius, and the stationary duct portion may have a second radius smaller than the first radius. The duct assembly may further include a pair of actuated joints connecting the moveable duct portion to the stationary duct portion, where the actuated joints are configured to rotate the moveable duct portion about a duct collapse axis perpendicular to the mast axis.

In a second example, in the second duct configuration, the moveable duct portion is positioned adjacent to the stationary duct portion, such that a position of the moveable duct portion is shifted along the mast axis relative to a position of the stationary duct portion. The duct assembly may further include a pair of actuated joints connecting the moveable duct portion to the stationary duct portion, each of the pair of actuated joints configured to rotate the moveable duct portion into the shifted position relative to the stationary duct portion.

In a third example, in the first duct configuration, the stationary duct portion and the moveable duct portion meet at an inner connection point and an outer connection point, and in the second duct configuration, the moveable duct portion is folded outward from the rotor assembly along the outer connection point. The duct assembly may further include an actuator at the outer connection point, the actuator configured to fold the moveable duct portion outward to place the duct assembly in the second duct configuration.

The rotor system may further include a stator assembly that includes a stator hub configured to drive the rotor assembly and stator vanes coupled between the stator hub and the stationary duct portion. The rotor system may further include at least one latch for securing a position of the moveable duct portion in the first duct configuration, and at least one latch for securing a position of the moveable duct portion in the second duct configuration.

Another embodiment is a rotorcraft comprising a ducted rotor system that includes a rotor assembly and a duct assembly. The rotor assembly includes rotor blades extending from a mast axis and configured to rotate about the mast axis. The duct assembly includes a moveable duct portion and a stationary duct portion, where the moveable duct portion is configured to surround a first portion of the rotor assembly in a first duct configuration, and the duct assembly is configured to move the moveable duct portion away from the first portion of the rotor assembly in a second duct configuration.

In the first duct configuration, the moveable duct portion and the stationary duct portion may enclose the rotor assembly, and in the second duct configuration, the moveable duct portion and the stationary duct portion may not enclose the rotor assembly. The rotorcraft may further include a stator assembly that includes a stator hub configured to drive the rotor assembly and stator vanes coupled between the stator hub and the stationary duct portion.

In the second duct configuration, the moveable duct portion may be positioned around the stationary duct portion, such that the stationary duct portion and the moveable duct portion surround the first portion of the rotor assembly. Alternatively, in the second duct configuration, the moveable duct portion may be positioned adjacent to the stationary duct portion, such that a position of the moveable duct portion is shifted along the mast axis relative to a position of the stationary duct portion. Alternatively, in the first duct configuration, the stationary duct portion and the moveable duct portion may meet at an inner connection point and an outer connection point, and in the second duct configuration, the moveable duct portion may be folded outward from the rotor assembly along the outer connection point.

Yet another embodiment is a tiltrotor aircraft including a rotor assembly, a duct assembly, and a tilting mechanism. The rotor assembly includes rotor blades extending from a mast axis and configured to rotate about the mast axis. The duct assembly includes a moveable duct portion and a stationary duct portion, where the moveable duct portion is configured to surround a first portion of the rotor assembly in a first duct configuration, and the duct assembly is configured to move the moveable duct portion away from the first portion of the rotor assembly in a second duct configuration. The tilting mechanism is configured to tilt the rotor assembly and the duct assembly about a tilt axis perpendicular to the mast axis.

In the first duct configuration, the moveable duct portion and the stationary duct portion may enclose the rotor assembly, and in the second duct configuration, the moveable duct portion and the stationary duct portion may not enclose the rotor assembly. The tilting mechanism may position the rotor assembly and duct assembly alternately in a hover mode and a cruise mode, where the duct assembly is configured to place the moveable duct portion in the first duct configuration during the hover mode, and the duct assembly is configured to place the moveable duct portion in the second duct configuration during the cruise mode. The tiltrotor aircraft may further include a stator assembly stator assembly that includes a stator hub configured to drive the rotor assembly and stator vanes coupled between the stator hub and the stationary duct portion.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
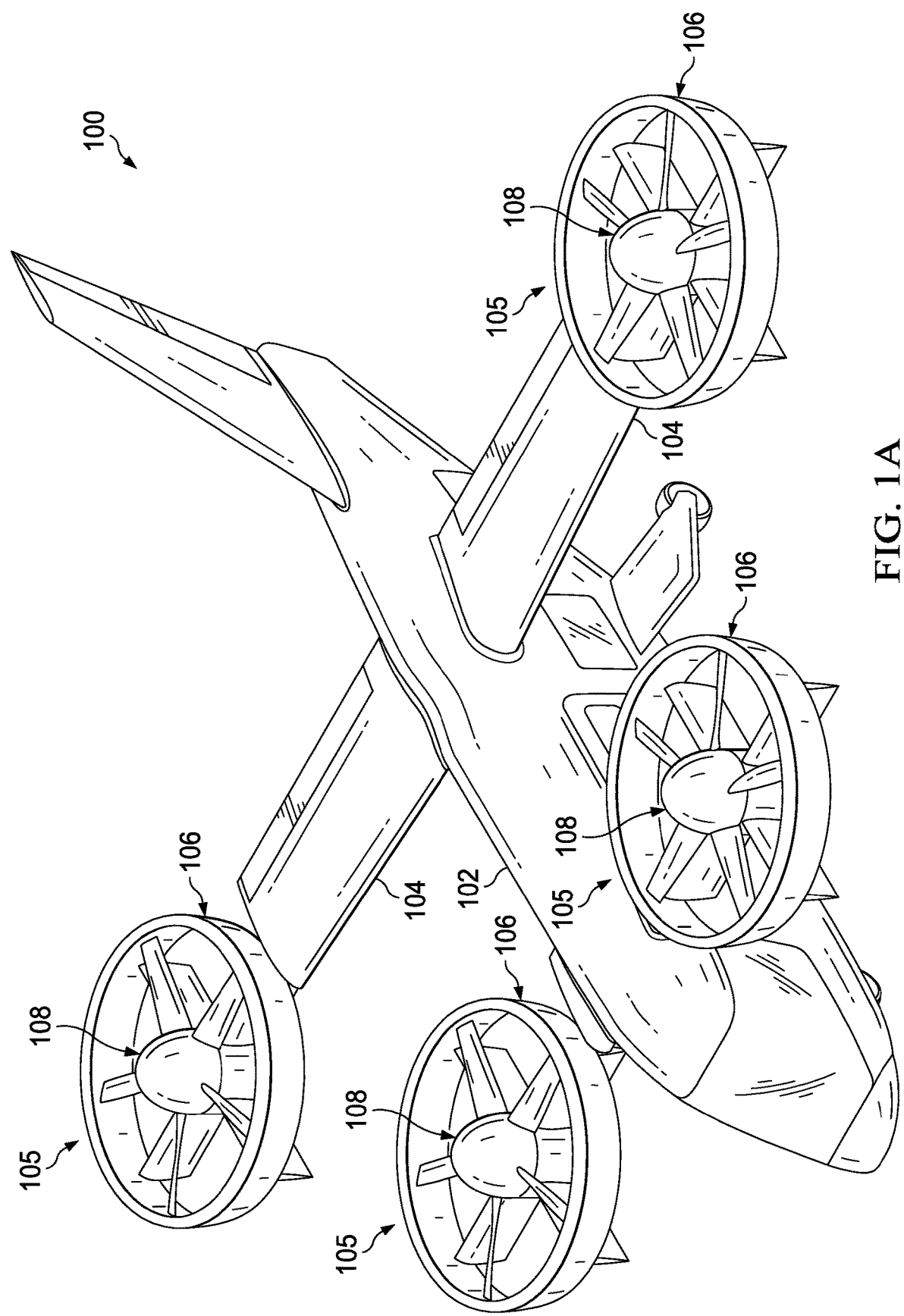
FIGS. 1A-1B illustrate a tilting ducted rotor aircraft including reconfigurable ducts in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a rotor system that includes a rotor assembly and a reconfigurable duct. In a first configuration, the reconfigurable duct encloses the rotor assembly; this configuration is referred to as a "full duct" configuration. In a second configuration, a portion of the reconfigurable duct is moved away from the rotor assembly, and the reconfigurable duct no longer encloses the rotor assembly. In some examples, a portion of the reconfigurable duct collapses, and the second configuration is referred to as a "collapsed" configuration. In other examples, a portion of the reconfigurable duct unfolds, and the second configuration is referred to as an "unfolded" configuration. The rotor system can be used in a tiltrotor aircraft that has a hover mode and cruise mode. The full duct configuration is used for hover mode, when the fully enclosed rotor provides enhanced downward thrust. When the tiltrotor aircraft switches to cruise mode, the duct reconfigures into the collapsed or unfolded configuration, so that the rotor assembly is no longer enclosed. This reduces the drag caused by the duct during the cruise mode and allows the aircraft to travel more efficiently.

Figure 1B:
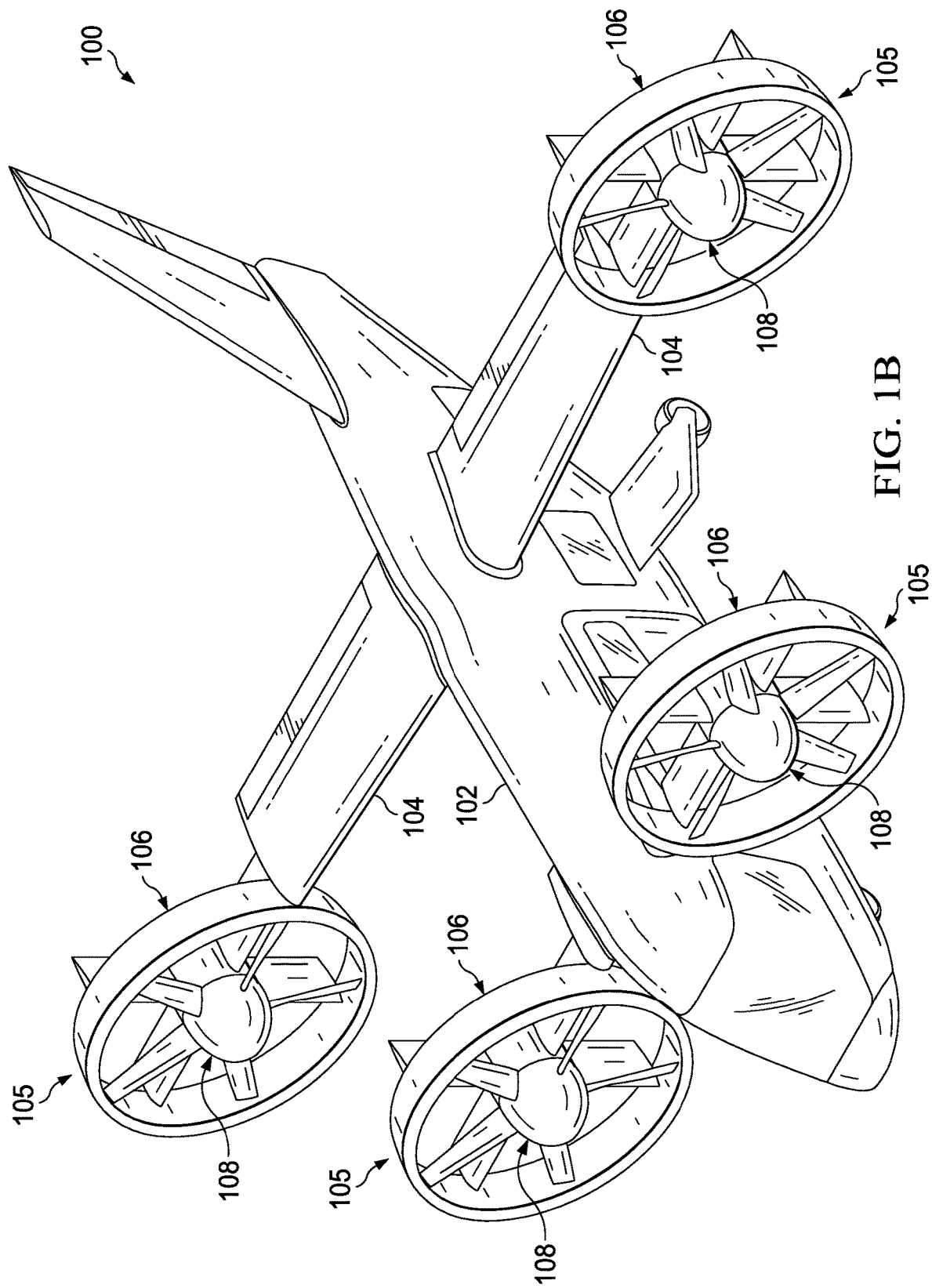

FIGS. 1A and 1B illustrate an example tiltrotor aircraft 100 that includes reconfigurable ducted rotors. The tiltrotor aircraft 100 is convertible between an a hover mode (shown in FIG. 1A), which allows for vertical takeoff and landing, hovering, and low speed directional movement, and a cruise mode (shown in FIG. 1B), which allows for forward flight as well as horizontal takeoff and landing. The hover mode may alternately be referred to as helicopter mode, and the cruise mode may alternately be referred to as airplane mode. Tiltrotor aircraft 100 includes a fuselage 102, wings 104, and a plurality of reconfigurable propulsion assemblies 105.

Each reconfigurable propulsion assembly 105 includes a reconfigurable duct assembly 106 rotatably coupled to fuselage 102 or wings 104, and a rotor assembly 108 including a plurality of rotor blades configured to rotate about a mast axis.

Rotor assemblies 108 can be collectively manipulated to selectively control direction, thrust, and lift of tiltrotor aircraft 100. The collective pitch of rotor assemblies 108 may be independently controlled from one another to allow for differential thrust output by reconfigurable propulsion assemblies 105. For example, the collective pitch of the rotor assembly 108 of one reconfigurable ducted rotor may be higher or lower than the collective pitch of rotor blade assembly of another reconfigurable ducted rotor such that the thrust generated by each reconfigurable ducted rotor differs from each of the others.

Reconfigurable propulsion assemblies 105 are each convertible, relative to fuselage 102, between a horizontal position, as shown in FIG. 1A, and a vertical position, as shown in FIG. 1B. Reconfigurable propulsion assemblies 105 are in the horizontal position during vertical takeoff and landing. Vertical takeoff and landing may be considered to include hover operations of tiltrotor aircraft 100. Reconfigurable propulsion assemblies 105 are in the vertical position during cruise mode, in which tiltrotor aircraft 100 is in forward flight. In cruise mode, reconfigurable propulsion assemblies 105 direct their respective thrusts in the aft direction to propel tiltrotor aircraft 100 forward. Tiltrotor aircraft 100 is operable to fly in all directions during the hover mode configuration of FIG. 1A, although faster forward flight is achievable while in the cruise mode configuration of FIG. 1B. Reconfigurable propulsion assemblies 105 may be tiltable between the vertical and horizontal positions by a rotatable shafts (not shown) extending through wings 104 and which are rotatable in response to commands originating from a pilot and/or a flight control system.

Figure 2:
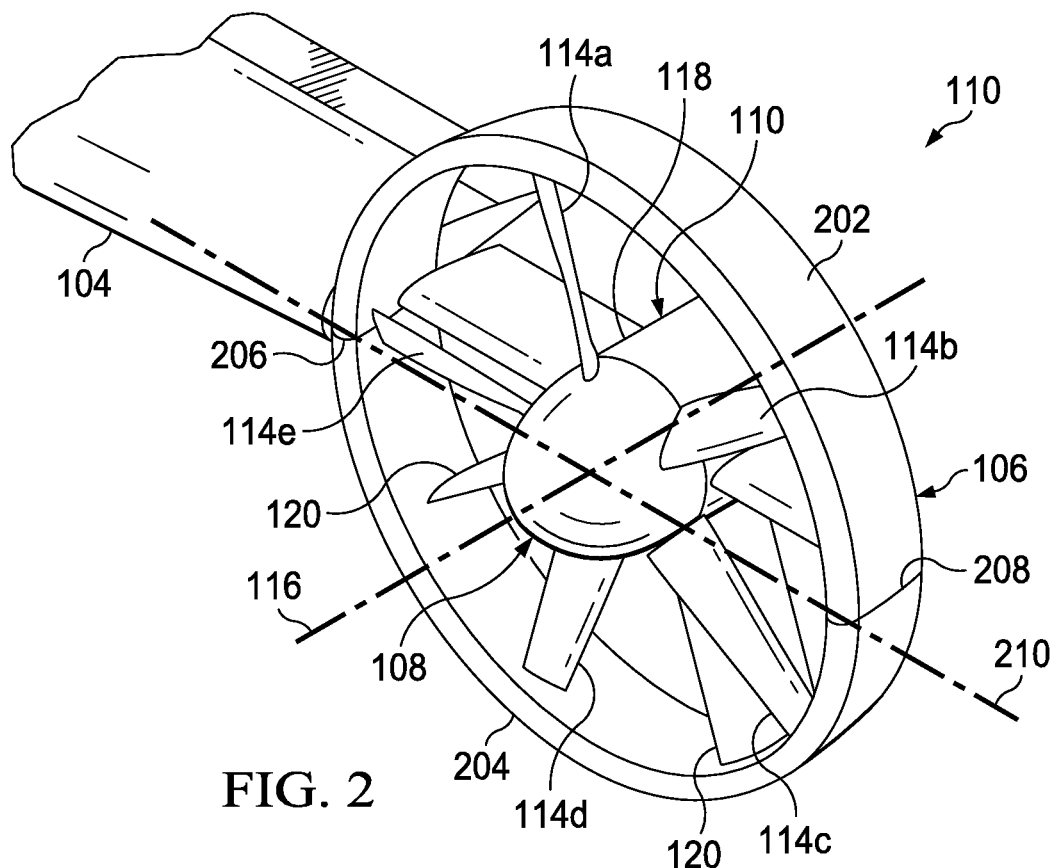
FIG. 2 illustrates a reconfigurable ducted rotor of the aircraft of FIGS. 1A-1B in a full duct configuration in accordance with embodiments described herein.
Figure 3:
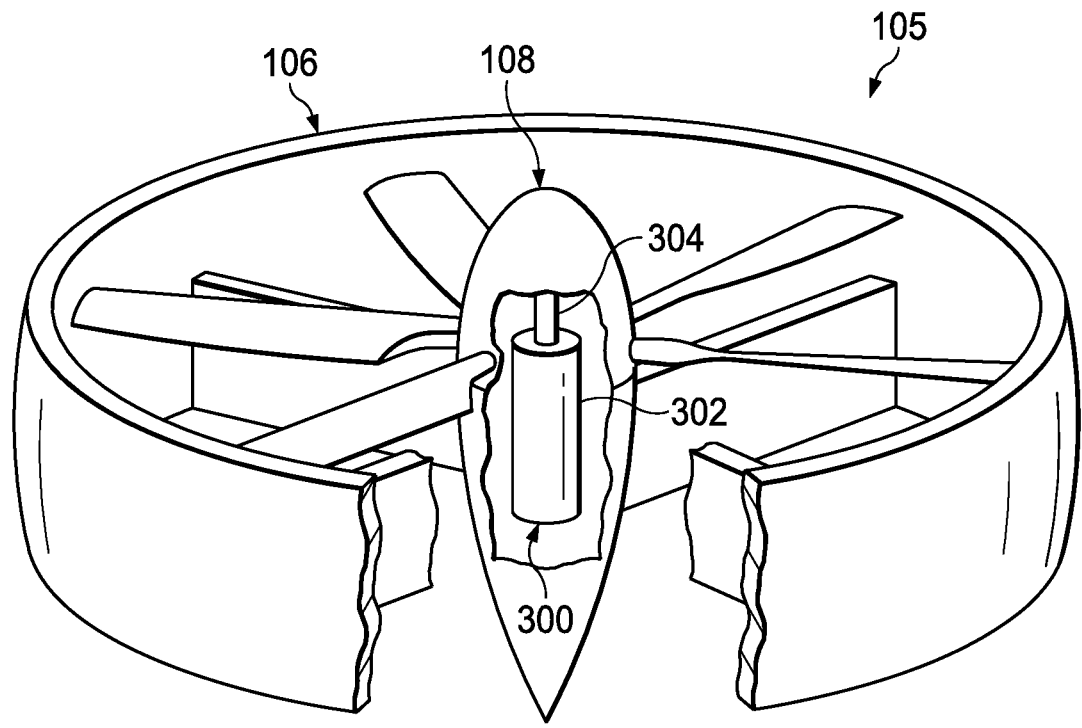
FIG. 3 is a close-up cutaway view of a portion of the rotor assembly of FIG. 2 in accordance with embodiments described herein.

As shown in FIG. 2, each reconfigurable propulsion assembly 105 includes a rotor assembly 108, a flow-straightening stator assembly 110, and a reconfigurable duct assembly 106. Rotor assembly 108 includes a plurality of rotor blades 114 extending from a mast axis 116 and configured to rotate about mast axis 116. Rotation of rotor blades 114 about mast axis 116 generates lift while operating in hover mode and thrust while operating in cruise mode. Stator assembly 110 is positioned downstream of rotor blades 114 and includes a stator hub 118 centrally located within reconfigurable duct assembly 106 and a plurality of stator vanes 120 coupled between reconfigurable duct assembly 106 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a driveshaft passing through a wing 104 or attachment post and the adjacent stator vane 120. FIG. 3 is a close-up cutaway view of a portion of the rotor assembly 108 of FIG. 2. As shown in FIG. 3, each of the reconfigurable propulsion assemblies 105 may utilize an electric motor assembly 300 disposed within a respective rotatable pylon 302 as a power source to rotate the respective rotor assembly 108 via a rotor mast 304.

Reconfigurable duct assembly 106 includes a moveable duct portion 202 and a stationary duct portion 204. In FIG. 2, reconfigurable duct assembly 106 is in the full duct configuration, i.e., moveable duct portion 202 and stationary duct portion 204 form a full duct that surrounds and encloses rotor assembly 108 and stator assembly 110. In this configuration, moveable duct portion 202 surrounds a first, upper portion of the rotor assembly 108 (in this case, including blades 114a and 114b), and stationary duct portion 204 surrounds a second, lower portion of the rotor assembly 108 (in this case, blades 114c, 114d, and 114e). Note that, as rotor assembly 108 rotates relative to reconfigurable duct assembly 106, the rotor blades 114 included in the first, upper portion and second, lower portion of rotor assembly 108 change.

As noted above, stator assembly 110 includes stator vanes 120 coupled between reconfigurable duct assembly 106 and stator hub 118. More particularly, as shown in FIG. 2, stator vanes 120 are coupled between stator hub 118 and stationary duct portion 204 of the reconfigurable duct assembly 106. Stator vanes 120 are not coupled to moveable duct portion 202.

Moveable duct portion 202 and stationary duct portion 204 meet at an inner joint 206 and an outer joint 208, collectively referred to as joints 206 and 208. Inner joint 206 is nearer to fuselage 102 relative to outer joint 208. Joints 206 and 208 are connections between moveable duct portion 202 and stationary duct portion 204. One or both of joints 206 and 208 may be actuated joints for moving moveable duct portion 202 away from rotor assembly 108, such that moveable duct portion 202 does not surround the upper portion of rotor assembly 108, and the rotor assembly 108 is not enclosed by the reconfigurable duct assembly 106. One or both joints 206 and 208 may include a latch for securing moveable duct portion 202 in the full duct configuration shown in FIG. 2. One or both joints 206 and 208 may further include a second latch, or use the same latch, to secure moveable duct portion 202 in a collapsed or unfolded configuration, such as any of the configurations shown in FIGS. 4-6. Inner joint 206 and outer joint 208 are positioned along a duct collapse axis 210 perpendicular to the mast axis 116. Duct collapse axis 210 may be an axis along which moveable duct portion 202 moves or collapses, e.g., an axis about which moveable duct portion 202 rotates, as in the example shown in FIG. 4. Two additional examples for moving the moveable duct portion 202 away from the first portion of the rotor assembly 108 are shown in FIGS. 5 and 6.

Figure 4:
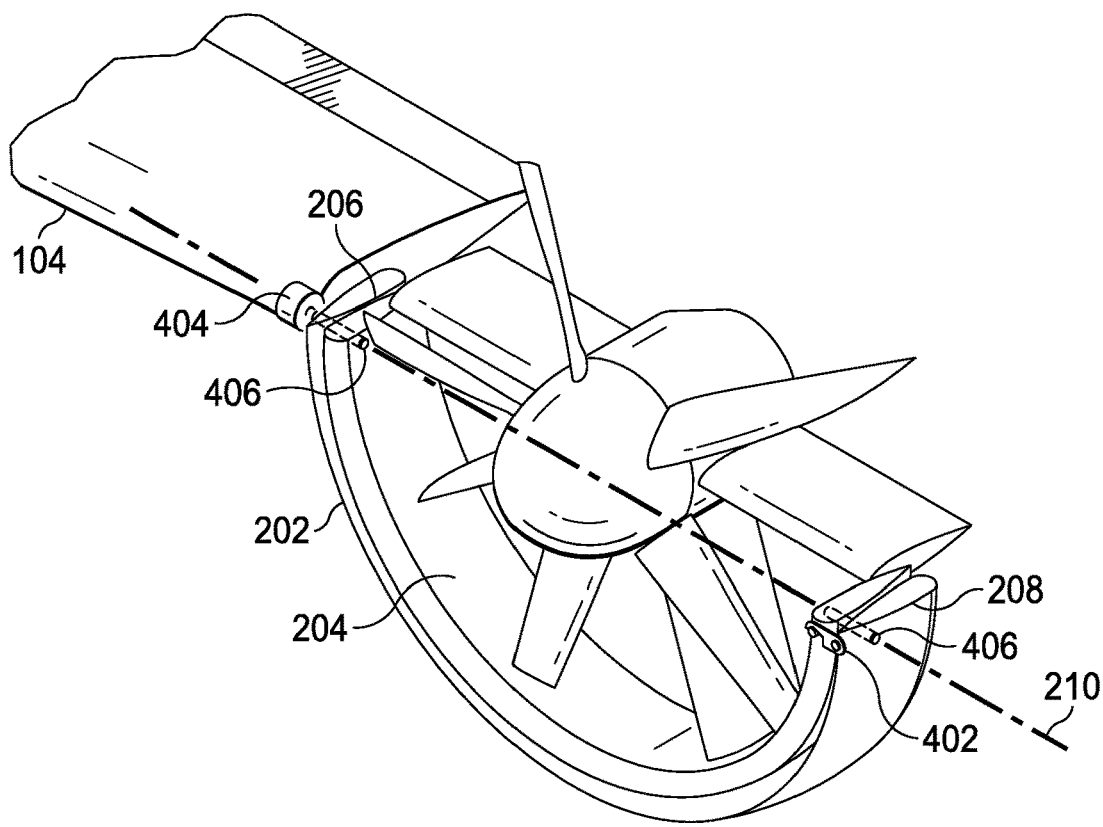
FIG. 4 illustrates a first example embodiment of a collapsed reconfigured ducted rotor in accordance with embodiments described herein.

FIG. 4 illustrates a first example embodiment of a collapsed reconfigured ducted rotor. In this example, moveable duct portion 202 is positioned around the outside of stationary duct portion 204. Both moveable duct portion 202 and stationary duct portion 204 surround the second, lower portion of rotor assembly 108; moveable duct portion 202 also surrounds stationary duct portion 204. In this example, moveable duct portion 202 may be larger than stationary duct portion 204 so that moveable duct portion 202 can fit around stationary duct portion 204. In particular, an outer radius of stationary duct portion 204 is smaller than an inner radius of moveable duct portion 202.

As noted above, moveable duct portion 202 and stationary duct portion 204 are connected by a pair of joints 206 and 208. In this example, joints 206 and 208 are actuated joints configured to rotate moveable duct portion 202 about duct collapse axis 210, from the full duct position shown in FIG. 2 to the collapsed position shown in FIG. 4, and vice versa. In the example shown in FIG. 4, joints 206 and 208 each include an axle 406 along duct collapse axis 210. Axles 406 extend through moveable duct portion 202 and allow rotation of moveable duct portion 202. Axles 406 are fixed to stationary duct portion 204, so that stationary duct portion 204 cannot rotate about axles 406. Moveable duct portion 202 can rotate between the full duct configuration and collapsed configuration along the axles 406.

One or both joints 206 and 208 further include an actuator for moving moveable duct portion 202 between the full duct configuration and collapsed configuration. In the example shown in FIG. 4, inner joint 206 includes a control mechanism 404 configured to control rotation of moveable duct portion 202 about axles 406. In this example, the position of moveable duct portion 202 is controlled by control mechanism 404 at inner joint 206, and moveable duct portion 202 rotates freely about the axle at outer joint 208; in other embodiments, a control mechanism 404 is included at both inner joint 206 and outer joint 208, or only at outer joint 208.

One or both joints 206 and 208 further include one or more latches for securing moveable duct portion 202 in a given configuration (full duct or collapsed). In the example shown in FIG. 4, a latch 402 at outer joint 208 is shown securing moveable duct portion 202 to stationary duct portion 204 in the collapsed configuration. Another latch may be included to secure moveable duct portion 202 in the full duct configuration. In other examples, inner joint 206 alternatively or additionally includes a latch or set of latches.

Figure 5A:
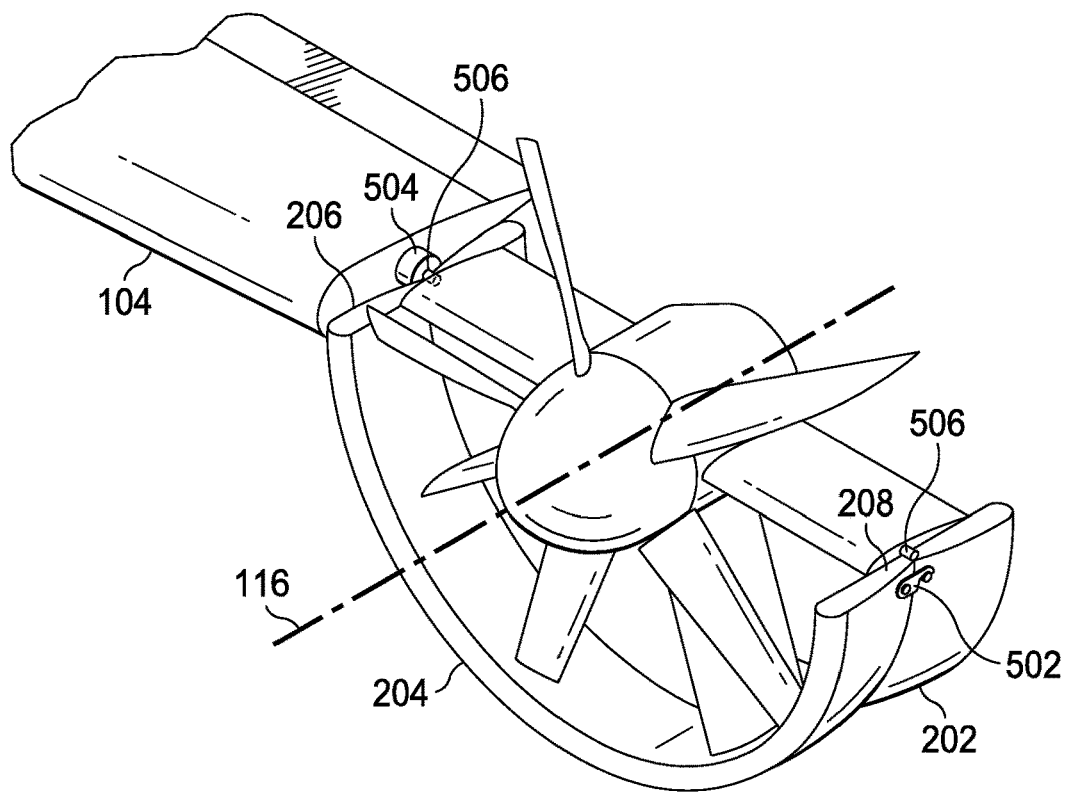
FIG. 5A illustrates a front perspective view of a second example embodiment of a collapsed reconfigured ducted rotor in accordance with embodiments described herein.
Figure 5B:
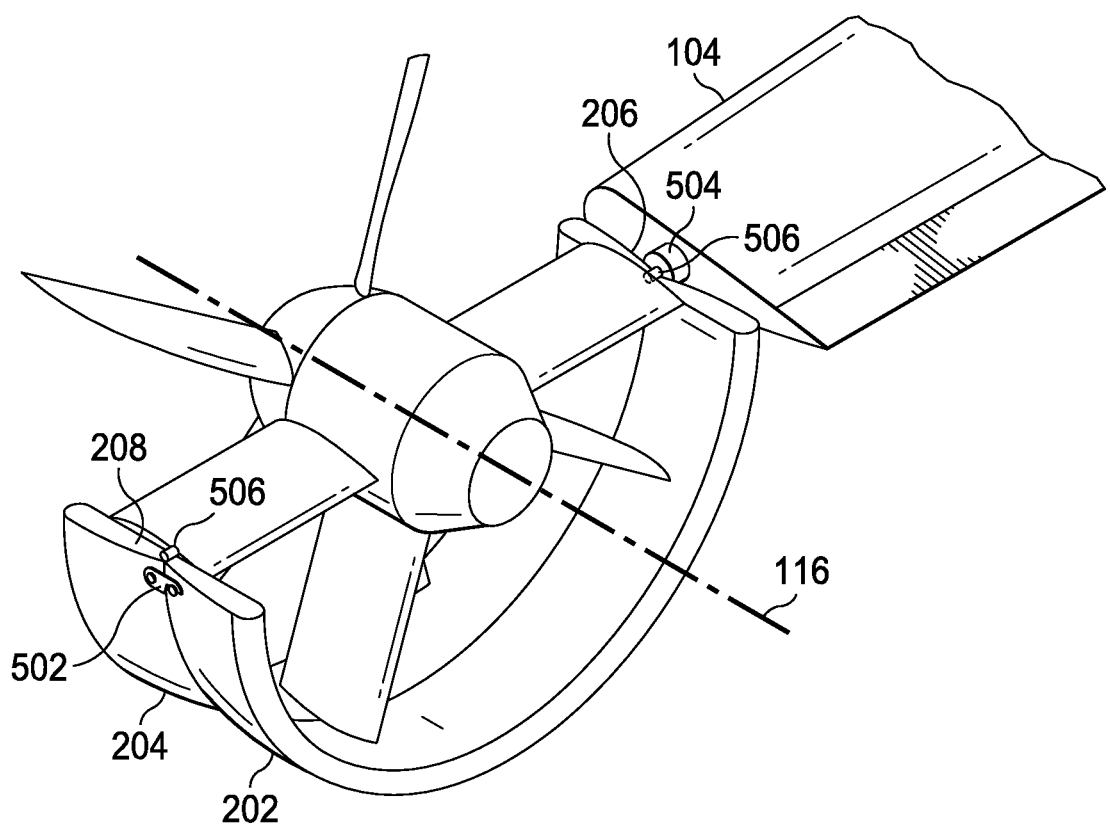
FIG. 5B illustrates a back perspective view of the second example embodiment of the collapsed reconfigured ducted rotor in accordance with embodiments described herein.
Figure 6:
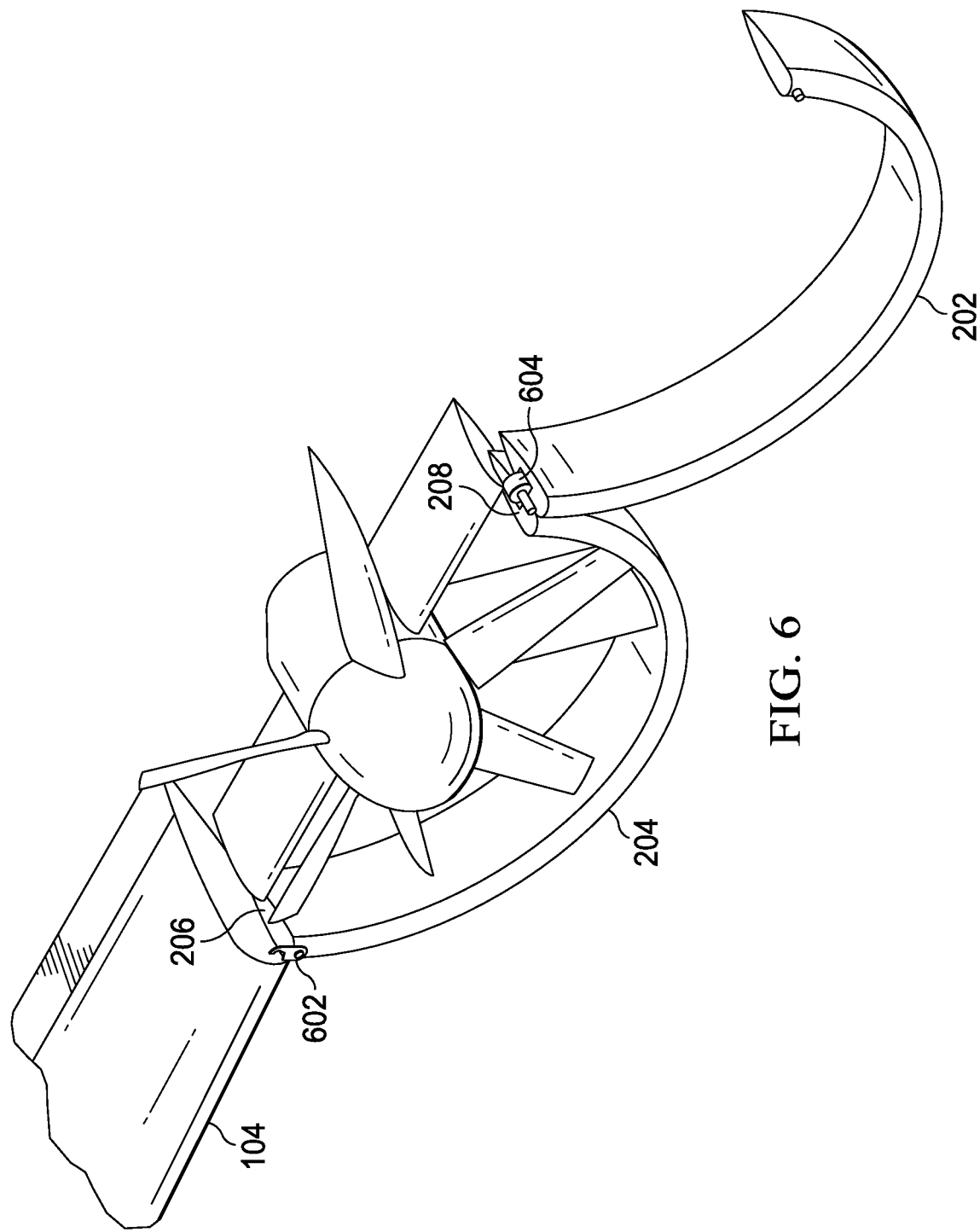
FIG. 6 illustrates an example embodiment of a reconfigured ducted rotor in an unfolded configuration in accordance with embodiments described herein.

FIG. 5A illustrates a front perspective view of a second example embodiment of a collapsed reconfigured ducted rotor, and FIG. 5B illustrates a back perspective view of the second example embodiment. In this example, moveable duct portion 202 is positioned behind and adjacent to stationary duct portion 204. More particularly, the position of moveable duct portion 202 is shifted along mast axis 116 relative to the position of stationary duct portion 204, which has not changed from its position in FIG. 2. In this example, moveable duct portion 202 and stationary duct portion 204 may be a same size.

In the example shown in FIGS. 5A and 5B, joints 206 and 208 are actuated joints configured to rotate moveable duct portion 202 along a pair of hinges 506 from the full duct position shown in FIG. 2 to the collapsed position shown in FIGS. 5A and 5B, and vice versa. Hinges 506 connect moveable duct portion 202 and stationary duct portion 204 and move moveable duct portion 202 relative to stationary duct portion 204, which is fixed in place (e.g., at the joint to wing 104). In particular, hinges 506 allow moveable duct portion 202 to rotate between the full duct configuration and collapsed configuration along hinges 506.

One or both joints 206 and 208 further include an actuator for moving moveable duct portion 202 between the full duct configuration and collapsed configuration. In the example shown in FIGS. 5A and 5B, inner joint 206 includes a control mechanism 504 configured to control rotation of moveable duct portion 202 about hinges 506. In this example, the position of moveable duct portion 202 is controlled by control mechanism 504 at inner joint 206, and moveable duct portion 202 rotates freely about the hinge at outer joint 208; in other embodiments, a control mechanism 504 is included at both inner joint 206 and outer joint 208, or only at outer joint 208.

One or both joints 206 and 208 further include one or more latches for securing moveable duct portion 202 in a given configuration (full duct or collapsed). In the example shown in FIGS. 5A and 5B, a latch 502 at outer joint 208 is shown securing moveable duct portion 202 to stationary duct portion 204 in the collapsed configuration. Another latch may be included to secure moveable duct portion 202 in the full duct configuration. In other examples, inner joint 206 alternatively or additionally includes a latch or set of latches.

In an alternate configuration, the hinges 506 are on the front side of the joints 206 and 208, and the moveable duct portion 202 is rotated into a position toward the front of tiltrotor aircraft 100 and in front of stationary duct portion 204.

FIG. 6 illustrates an example embodiment of a reconfigured ducted rotor in an unfolded configuration. Moveable duct portion 202 is folded outward along outer joint 208, away from the rotor assembly 108 and away from the body of tiltrotor aircraft 100. In this example, moveable duct portion 202 and stationary duct portion 204 may be a same size.

In the example shown in FIG. 6, outer joint 208 is an actuated joint configured to fold and unfold moveable duct portion 202 along a hinge 606 from the full duct position shown in FIG. 2 to the unfolded position shown in FIG. 6, and vice versa. Hinge 606 connects moveable duct portion 202 and stationary duct portion 204 and moves moveable duct portion 202 relative to stationary duct portion 204, which is fixed in place (e.g., at the joint to wing 104).

Outer joint 208 further includes an actuator for moving moveable duct portion 202 between the full duct configuration and collapsed configuration. In the example shown in FIG. 6, outer joint 208 includes a control mechanism 604 configured to control rotation of moveable duct portion 202 about hinge 606.

One or both joints 206 and 208 further include one or more latches for securing moveable duct portion 202 in a given configuration (full duct or collapsed). In the example shown in FIG. 6, a latch 602 at inner joint 206 is configured to secure moveable duct portion 202 to stationary duct portion 204 in the full duct configuration. One or more additional latches may be included to secure moveable duct portion 202 in the unfolded configuration, e.g., a latch or other fixing mechanism may be included at outer joint 208.

Moveable duct portion 202 in the unfolded configuration shown in FIG. 6 may improve performance of tiltrotor aircraft 100 during cruise mode by increases the effective lifting surface of tiltrotor aircraft 100.

Example 1 is a propulsion system including a rotor blade assembly and a duct assembly. The rotor blade assembly includes a plurality of rotor blades extending from a mast axis, the plurality of rotor blades configured to rotate about the mast axis. The duct assembly includes a moveable duct portion and a stationary duct portion, where in a first duct configuration, the moveable duct portion surrounds a first portion of the rotor assembly, the stationary duct portion surrounds a second portion of the rotor assembly, and the moveable duct portion and the stationary duct portion enclose the rotor assembly; and in a second duct configuration, the stationary duct portion surrounds the second portion of the rotor assembly, and the moveable duct portion is moved away from the first portion of the rotor assembly, such that the rotor assembly is not enclosed.

Example 2 provides the propulsion system according to example 1, where in the second duct configuration, the moveable duct portion is positioned around the stationary duct portion, such that the stationary duct portion and the moveable duct portion surround the second portion of the rotor assembly.

Example 3 provides the propulsion system according to example 2, where the moveable duct portion has a first radius, and the stationary duct portion has a second radius smaller than the first radius.

Example 4 provides the propulsion system according to either of examples 2 or 3, where the duct assembly further includes a pair of actuated joints connecting the moveable duct portion to the stationary duct portion, the actuated joints configured to rotate the moveable duct portion about a duct collapse axis perpendicular to the mast axis.

Example 5 provides the propulsion system according to example 1, where in the second duct configuration, the moveable duct portion is positioned adjacent to the stationary duct portion, such that a position of the moveable duct portion is shifted along the mast axis relative to a position of the stationary duct portion.

Example 6 provides the propulsion system according to example 5, where the duct assembly further includes a pair of actuated joints connecting the moveable duct portion to the stationary duct portion, each of the pair of actuated joints comprising a hinge configured to rotate the moveable duct portion into the shifted position relative to the stationary duct portion.

Example 7 provides the propulsion system according to example 1, where in the first duct configuration, the stationary duct portion and the moveable duct portion meet at an inner connection point and an outer connection point, and in the second duct configuration, the moveable duct portion is folded outward from the rotor assembly along the outer connection point.

Example 8 provides the propulsion system according to example 7, where the duct assembly further includes an actuator at the outer connection point, the actuator configured to fold the moveable duct portion outward to place the duct assembly in the second duct configuration.

Example 9 provides the propulsion system according to any of examples 1 through 8, further including a stator assembly including a stator hub configured to drive the rotor assembly and a plurality of stator vanes coupled between the stator hub and the stationary duct portion.

Example 10 provides the propulsion system according to any of examples 1 through 9, further including at least one latch for securing a position of the moveable duct portion in the first duct configuration, and at least one latch for securing a position of the moveable duct portion in the second duct configuration.

Example 11 provides a rotorcraft including a ducted propulsion system, the ducted propulsion system including a rotor assembly and a duct assembly. The rotor assembly includes a plurality of rotor blades extending from a mast axis, the plurality of rotor blades configured to rotate about the mast axis. The duct assembly includes a moveable duct portion and a stationary duct portion, the moveable duct portion configured to surround a first portion of the rotor assembly in a first duct configuration, and the duct assembly configured to move the moveable duct portion away from the first portion of the rotor assembly in a second duct configuration.

Example 12 provides the rotorcraft according to example 11, where in the first duct configuration, the moveable duct portion and the stationary duct portion enclose the rotor assembly, and in the second duct configuration, the moveable duct portion and the stationary duct portion do not enclose the rotor assembly.

Example 13 provides the rotorcraft according to either of example 11 and 12, where in the second duct configuration, the moveable duct portion is positioned around the stationary duct portion, such that the stationary duct portion and the moveable duct portion surround the first portion of the rotor assembly.

Example 14 provides the rotorcraft according to either of example 11 and 12, where in the second duct configuration, the moveable duct portion is positioned adjacent to the stationary duct portion, such that a position of the moveable duct portion is shifted along the mast axis relative to a position of the stationary duct portion.

Example 15 provides the rotorcraft according to either of example 11 and 12, where in the first duct configuration, the stationary duct portion and the moveable duct portion meet at an inner connection point and an outer connection point, and in the second duct configuration, the moveable duct portion is folded outward from the rotor assembly along the outer connection point.

Example 16 provides the rotorcraft according to any of examples 11 through 15, further including a stator assembly including a stator hub configured to drive the rotor assembly and a plurality of stator vanes coupled between the stator hub and the stationary duct portion.

Example 17 provides a tiltrotor aircraft including a rotor assembly, a duct assembly, and a tilting mechanism. The rotor assembly includes a plurality of rotor blades extending from a mast axis, the plurality of rotor blades configured to rotate about the mast axis. The duct assembly includes a moveable duct portion and a stationary duct portion, the moveable duct portion configured to surround a first portion of the rotor assembly in a first duct configuration, and the duct assembly configured to move the moveable duct portion away from the first portion of the rotor assembly in a second duct configuration. The tilting mechanism is configured to tilt the rotor assembly and the duct assembly about a tilt axis perpendicular to the mast axis.

Example 18 provides the tiltrotor aircraft according to example 17, where in the first duct configuration, the moveable duct portion and the stationary duct portion enclose the rotor assembly, and in the second duct configuration, the moveable duct portion and the stationary duct portion do not enclose the rotor assembly.

Example 19 provides the tiltrotor aircraft according to either of examples 17 or 18, where the tilting mechanism positions the rotor assembly and duct assembly alternately in a hover mode and a cruise mode, the duct assembly is configured to place the moveable duct portion in the first duct configuration during the hover mode, and the duct assembly is configured to place the moveable duct portion in the second duct configuration during the cruise mode.

Example 20 provides the tiltrotor aircraft according to any of examples 17 through 19, further including a stator assembly including a stator hub configured to drive the rotor assembly and a plurality of stator vanes coupled between the stator hub and the stationary duct portion.

It should be appreciated that aircraft illustrated herein, such as tiltrotor aircraft 100, are merely illustrative of a variety of aircraft that can implement the embodiments disclosed herein. Indeed, the various embodiments of the rotor system with reconfigurable duct described herein may be used on any aircraft that utilizes rotors. Other aircraft implementations can include hybrid aircraft, dual tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein for a rotor system with reconfigurable duct can be integrated into a variety of aircraft configurations. In some embodiments, an aircraft includes multiple different rotor systems, e.g., one set of rotors with reconfigurable ducts, and another set of rotors with non-reconfigurable ducts; or one set of rotors with reconfigurable ducts, and another set of unducted rotors. It should be appreciated that even though aircraft are particularly well-suited to implement the embodiments of the present disclosure, non-aircraft vehicles and devices can also implement the embodiments.

The components of reconfigurable propulsion assembly 105 may comprise any materials suitable for use with an aircraft rotor. For example, rotor blades 114 and stator hub 118 may comprise carbon fiber or aluminum; these or other components of reconfigurable propulsion assembly 105 may comprise steel or titanium. While rotor assemblies 108 are shown with five rotor blades 114, respectively, it should be understood that they may have as few as two rotor blades and may have more than five rotor blades.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A propulsion system comprising:
   a rotor assembly comprising a plurality of rotor blades extending from a mast axis, the plurality of rotor blades configured to rotate about the mast axis;
   a duct assembly comprising a moveable duct portion and a stationary duct portion, wherein:
      in a first duct configuration, the moveable duct portion surrounds a first portion of the rotor assembly, the stationary duct portion surrounds a second portion of the rotor assembly, and the moveable duct portion and the stationary duct portion encircle the rotor assembly; and
      in a second duct configuration, the stationary duct portion surrounds the second portion of the rotor assembly, and the moveable duct portion is moved away from the first portion of the rotor assembly and positioned around the stationary duct portion, such that the rotor assembly is not encircled; and
   a pair of actuated joints connecting the moveable duct portion to the stationary duct portion, the actuated joints configured to rotate the moveable duct portion about a duct collapse axis perpendicular to the mast axis.

2. The propulsion system of claim 1, wherein, in the second duct configuration, the stationary duct portion and the moveable duct portion surround the second portion of the rotor assembly.

3. The propulsion system of claim 2, wherein the moveable duct portion has a first radius, and the stationary duct portion has a second radius smaller than the first radius.

4. The propulsion system of claim 1, further comprising a stator assembly comprising:
   a stator hub configured to drive the rotor assembly; and
   a plurality of stator vanes coupled between the stator hub and the stationary duct portion.

5. The propulsion system of claim 1, further comprising at least one latch for securing a position of the moveable duct portion in the first duct configuration, and at least one latch for securing a position of the moveable duct portion in the second duct configuration.

6. The propulsion system of claim 1, wherein the duct collapse axis extends through the stationary duct portion and the moveable duct portion in both the first duct configuration and the second duct configuration.

7. The propulsion system of claim 1, wherein the pair of actuated joints are arranged on opposite sides of the duct assembly.

8. The propulsion system of claim 1, wherein each of the actuated joints comprises an axle along the duct collapse axis, each axle extending through a respective portion of the moveable duct portion.

9. The propulsion system of claim 8, wherein the axles enable rotation of the moveable duct portion along the duct collapse axis.

10. A rotorcraft comprising a ducted propulsion system, the ducted propulsion system comprising:
    a rotor assembly comprising a plurality of rotor blades extending from a mast axis, the plurality of rotor blades configured to rotate about the mast axis;
    a duct assembly comprising a moveable duct portion and a stationary duct portion, the moveable duct portion configured to surround a first portion of the rotor assembly in a first duct configuration, and the duct assembly configured to move the moveable duct portion away from the first portion of the rotor assembly in a second duct configuration, wherein, in the second duct configuration, the moveable duct portion is positioned around the stationary duct portion; and
    a pair of actuated joints connecting the moveable duct portion to the stationary duct portion, the actuated joints configured to rotate the moveable duct portion about a duct collapse axis perpendicular to the mast axis.

11. The rotorcraft of claim 10, wherein, in the first duct configuration, the moveable duct portion and the stationary duct portion enclose the rotor assembly, and in the second duct configuration, the moveable duct portion and the stationary duct portion do not enclose the rotor assembly.

12. The rotorcraft of claim 10, wherein, in the second duct configuration, the stationary duct portion and the moveable duct portion surround the first portion of the rotor assembly.

13. The rotorcraft of claim 10, further comprising a stator assembly comprising:
    a stator hub configured to drive the rotor assembly; and
    a plurality of stator vanes coupled between the stator hub and the stationary duct portion.

14. The rotorcraft of claim 10, wherein the duct collapse axis extends through the stationary duct portion and the moveable duct portion in both the first duct configuration and the second duct configuration.

15. The rotorcraft of claim 10, wherein the pair of actuated joints are arranged on opposite sides of the duct assembly.

16. The rotorcraft of claim 10, wherein each of the actuated joints comprises an axle along the duct collapse axis, each axle extending through a respective portion of the moveable duct portion, and the axles enabling rotation of the moveable duct portion along the duct collapse axis.

17. A tiltrotor aircraft comprising:
    a rotor assembly comprising a plurality of rotor blades extending from a mast axis, the plurality of rotor blades configured to rotate about the mast axis;
    a duct assembly comprising a moveable duct portion and a stationary duct portion, the moveable duct portion configured to surround a first portion of the rotor assembly in a first duct configuration, and the duct assembly configured to move the moveable duct portion away from the first portion of the rotor assembly in a second duct configuration, wherein, in the second duct configuration, the moveable duct portion is positioned around the stationary duct portion;
    a pair of actuated joints connecting the moveable duct portion to the stationary duct portion, the actuated joints configured to rotate the moveable duct portion about a duct collapse axis perpendicular to the mast axis; and
    a tilting mechanism configured to tilt the rotor assembly and the duct assembly about a tilt axis perpendicular to the mast axis.

18. The tiltrotor aircraft of claim 17, wherein, in the first duct configuration, the moveable duct portion and the stationary duct portion enclose the rotor assembly, and in the second duct configuration, the moveable duct portion and the stationary duct portion do not enclose the rotor assembly.

19. The tiltrotor aircraft of claim 17, wherein the tilting mechanism positions the rotor assembly and duct assembly alternately in a hover mode and a cruise mode, wherein the duct assembly is configured to place the moveable duct portion in the first duct configuration during the hover mode, and the duct assembly is configured to place the moveable duct portion in the second duct configuration during the cruise mode.

20. The tiltrotor aircraft of claim 17, further comprising a stator assembly comprising:
   a stator hub configured to drive the rotor assembly; and
   a plurality of stator vanes coupled between the stator hub and the stationary duct portion.

\* \* \* \* \*